(12) United States Patent
Wakiyama et al.

(10) Patent No.: US 7,878,466 B2
(45) Date of Patent: Feb. 1, 2011

(54) APPARATUS SUPPORTING MECHANISM, SHEET FEEDING APPARATUS AND IMAGE FORMING APPARATUS

(75) Inventors: Eiji Wakiyama, Suntou-gun (JP); Yasuhiro Uchida, Yokohama (JP); Minoru Kawanishi, Yokohama (JP); Akira Matsushima, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/200,314

(22) Filed: Aug. 28, 2008

(65) Prior Publication Data

US 2009/0057529 A1 Mar. 5, 2009

(30) Foreign Application Priority Data

Sep. 4, 2007 (JP) ............................. 2007-228480

(51) Int. Cl.
*A47B 91/00* (2006.01)
(52) U.S. Cl. ............................. 248/188.8; 248/346.04; 271/1
(58) Field of Classification Search ............ 248/346.01, 248/346.03, 346.04, 346.05, 346.06, 188.1, 248/188.2, 188.3, 188.5, 188.8, 188.9, 188.91; 271/1, 145
See application file for complete search history.

(56) References Cited

U.S. PATENT DOCUMENTS 3,715,015 A * 2/1973 Morris ........................ 188/5
4,400,085 A * 8/1983 Nezu ........................... 355/76
4,648,613 A * 3/1987 Hennessy .................. 280/79.11
6,966,254 B2 * 11/2005 Ascari et al. ................. 99/489
7,147,218 B2 * 12/2006 Izumi et al. ................. 271/145
7,686,263 B2 * 3/2010 Inoue ....................... 248/188.2
2007/0069450 A1 3/2007 Kawanishi et al. ......... 271/162

FOREIGN PATENT DOCUMENTS

| DE | 584667 | 9/1933 |
|---|---|---|
| DE | 654196 | 12/1937 |
| JP | 10-236670 | 9/1998 |

* cited by examiner

*Primary Examiner*—Terrell Mckinnon
*Assistant Examiner*—Todd M. Epps
(74) *Attorney, Agent, or Firm*—Fitzpatrick, Cella, Harper & Scinto

(57) ABSTRACT

An apparatus supporting mechanism comprises: a fixing member 111 fixed to the bottom of the apparatus; a connecting member 115 disposed in the fixing member 111 in such a manner as to freely project and be housed; a supporting member 112 disposed in the connecting member 115 and freely displaced between a first position, at which the supporting member is grounded or located proximate with respect to the installation plane of the apparatus, a second position, at which the supporting member is separate from the installation plane of the apparatus; and a displacing mechanism which displaces the supporting member 112 to the first position when the connecting member 115 projects while displaces the supporting member 112 to the second position when the connecting member 115 is housed.

6 Claims, 6 Drawing Sheets

APPARATUS SUPPORTING MECHANISM, SHEET FEEDING APPARATUS AND IMAGE FORMING APPARATUS

BACKGROUND OF THE INVENTION

1. Field of the Invention

The present invention relates to an apparatus supporting mechanism which is disposed at a bottom of an apparatus movable on an installation plane for supporting the apparatus when the apparatus is installed. Furthermore, the present invention relates to a movable sheet feeding apparatus provided with the apparatus supporting mechanism and an image forming apparatus provided with the sheet feeding apparatus.

2. Description of the Related Art

The processing speed of image forming apparatuses such as printers or a copying machines has increased in recent years. A sheet feeding apparatus for supplying a sheet to the image forming apparatus tends to gradually increase a sheet stacking capacity. Such a sheet feeding apparatus of a large capacity is used in a state in which the image forming apparatus is mounted thereon, and therefore, a weight and an outer dimension are liable to become larger in use.

Sheet feeding apparatus having a large capacity is normally provided with casters including a pivotal fixing portion rotatably having wheels at the bottom thereof for the purpose of easy movement or installation. Moreover, the sheet feeding apparatus mostly includes a locking mechanism for locking the rotation of the wheels in the caster, or an adjusting mechanism with respect to an apparatus installation plane at the bottom of the apparatus, in order to prevent any movement of the apparatus in the case where an external force is exerted on the apparatus by an operator.

In the case of a heavy apparatus or an apparatus having a high center of gravity and having an adjusting mechanism with respect to the apparatus installation plane at the bottom of the apparatus, the adjusting mechanism may have to project outward from the outline of the apparatus in order to secure stability. In such a case, when the apparatus passes, for example, a step during its movement, there may occur an inconvenience that the adjusting mechanism projecting outward of the apparatus collides against the step. Also, package material for shipping the apparatus requires a larger size because of the outward projection of the adjusting mechanism, thereby increasing cost and reducing distribution efficiency.

A method for solving the above-described problems is exemplified by an apparatus to which an adjusting mechanism is detachably attached, or by an apparatus on or to which an adjusting mechanism is disposed in such a manner as to freely slide outward or be fixed (Japanese Patent Application Laid-open No. 10-236670).

However, in the prior art provided with the adjusting mechanism detachably attached to an apparatus body, as described above, a person who installs the apparatus needs to install the apparatus on a floor by rotating adjuster screws fitted at several points many times, thereby degrading workability. Moreover, when the apparatus is moved without detaching an adjuster unintentionally in the case where the apparatus is moved again by the casters after the apparatus is installed, the adjuster possibly collides against a step or other obstacle.

SUMMARY OF THE INVENTION

The present invention provides an apparatus supporting mechanism capable of enhancing operability, a sheet feeding apparatus provided with the same and an image forming apparatus.

An apparatus supporting mechanism for supporting an apparatus when the apparatus is installed on an installation plane, comprising: a fixing member for fixing the apparatus supporting mechanism to the bottom of the apparatus; a connecting member disposed in the fixing member in such a manner as to project from or to be retracted into said fixing member; a supporting member disposed on the connecting member and freely moveable between a first position, at which the supporting member is grounded or located adjacent the installation plane of the apparatus, and a second position, at which the supporting member is separated from the installation plane of the apparatus; and a displacing mechanism which is configured to move the supporting member to the first position if the connecting member projects from the fixing member and to move the supporting member to the second position if the connecting member is retracted into the fixing member.

Further features of the present invention will become apparent from the following description of exemplary embodiments (with reference to the attached drawings).

DESCRIPTION OF THE EMBODIMENTS

An apparatus supporting mechanism in embodiments according to the present invention is exemplified by disposing it in a sheet feeding apparatus and an image forming apparatus.

First Embodiment

Figure 6:
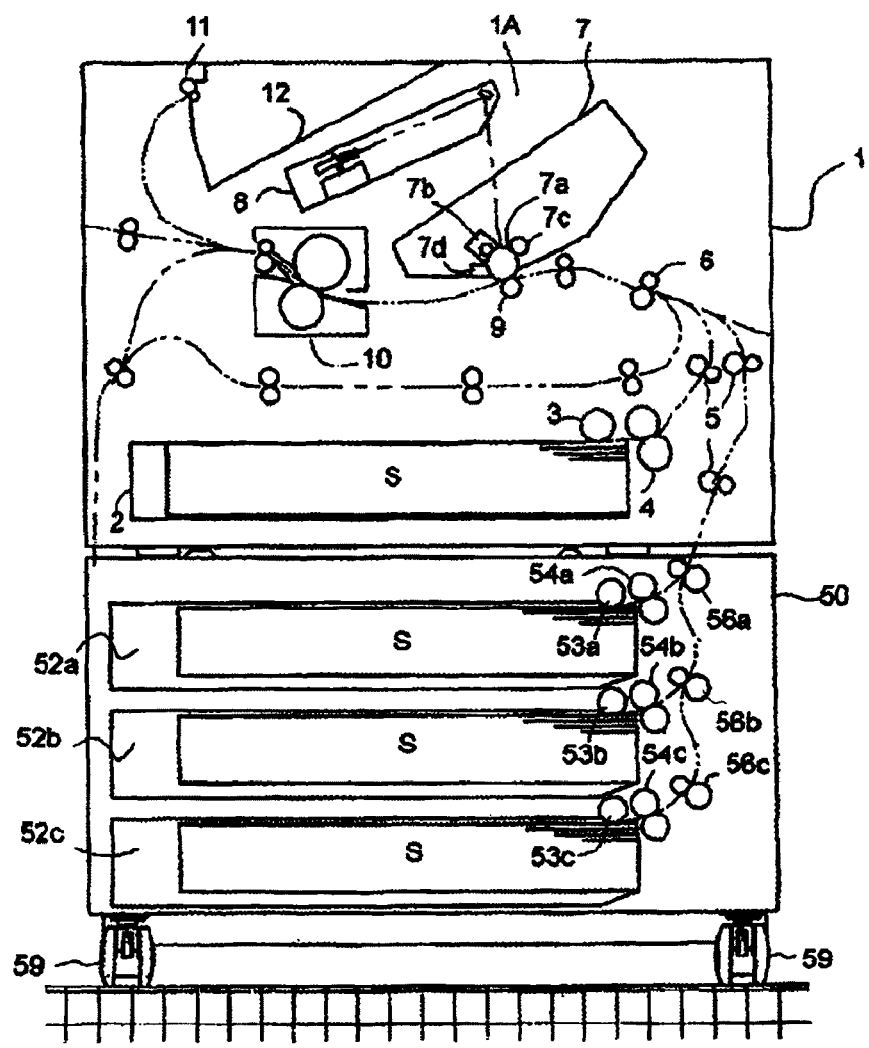
FIG. 6 is a front view illustrating the entire configuration of an image forming apparatus.

Entire Configurations and Operations of Image Forming Apparatus and Sheet Feeding Apparatus First of all, an image forming apparatus provided with an apparatus supporting mechanism will be described in reference to FIG. 6. Here, FIG. 6 illustrates the schematic configuration of a laser beam printer as one example of the image forming apparatus in the present embodiment. A printer body 1 is disposed above whereas a feeding deck 50 serving as a sheet feeding apparatus to be optionally fixed is disposed below.

The printer body 1 is provided with an image forming portion 1A which includes a process cartridge 7 having a photosensitive drum 7a, a charger 7b, a developing sleeve 7c and a cleaner 7d, a laser scanner 8 and a transfer roller 9.

Upon start of an image forming operation, in the image forming portion 1A, the laser scanner 8 illuminates the photosensitive drum 7a with a laser beam in response to an image signal, and then, an electrostatic latent image is formed on the photosensitive drum 7a. The electrostatic latent image is developed with a toner contained in the process cartridge 7, thereby forming a toner image on the photosensitive drum 7a.

Simultaneously with the above-described image forming operation, a sheet S is fed from a sheet cassette 2 disposed in the printer body 1 via a feed roller 3 and a pair of separation rollers 4 or from another sheet cassette 52 (52a, 52b or 52c) disposed in the feeding deck 50. The sheet S is conveyed to a transfer portion including the photosensitive drum 7a and the transfer roller 9 in synchronism with toner image formation on the photosensitive drum 7a via conveying rollers 5 and a pair of registration rollers 6. In the transfer portion, the toner image is transferred onto the sheet S.

The sheet S having the toner image transferred thereonto is conveyed to a fixing portion 10, in which the sheet S is pressurized and heated, to be thus fixed with the toner image. Thereafter, the sheet S is discharged onto a discharge portion 12 disposed at an upper portion in the apparatus via discharge rollers 11.

The feeding deck 50 serving as the sheet feeding apparatus is provided with the sheet cassettes 52 consisting of a plurality of sheet stacks (three in the present embodiment) and feed rollers 53 (53a, 53b and 53c) serving as sheet feeding members for feeding the sheets S stacked in the sheet cassettes, respectively. The three sheet cassettes 52 are configured to freely stack and feed sheets of various sizes and basis weights. Moreover, the feeding deck 50 also serves as a mount table for the printer body 1, and further, has casters 59 at four points at the lower surface of the apparatus body in consideration of the movement in a state in which the printer body 1 is placed on the feeding deck 50.

The feeding deck 50 is adapted to feed the sheet S via the feed roller 53 from the sheet cassette 52 upon receipt of a feed signal from the printer body 1. The sheets S fed via the feed roller 53 are separated one by one by a pair of separation rollers 54 (54a, 54b and 54c), and thereafter, are fed into the printer body 1 via conveyor rollers 56 (56a, 56b and 56c).

{Apparatus Supporting Mechanism}

Next, the apparatus supporting mechanism in the present embodiment disposed in the feeding deck 50 having the printer body 1 placed thereon will be described with reference to FIGS. 1 to 5.

Figure 4:
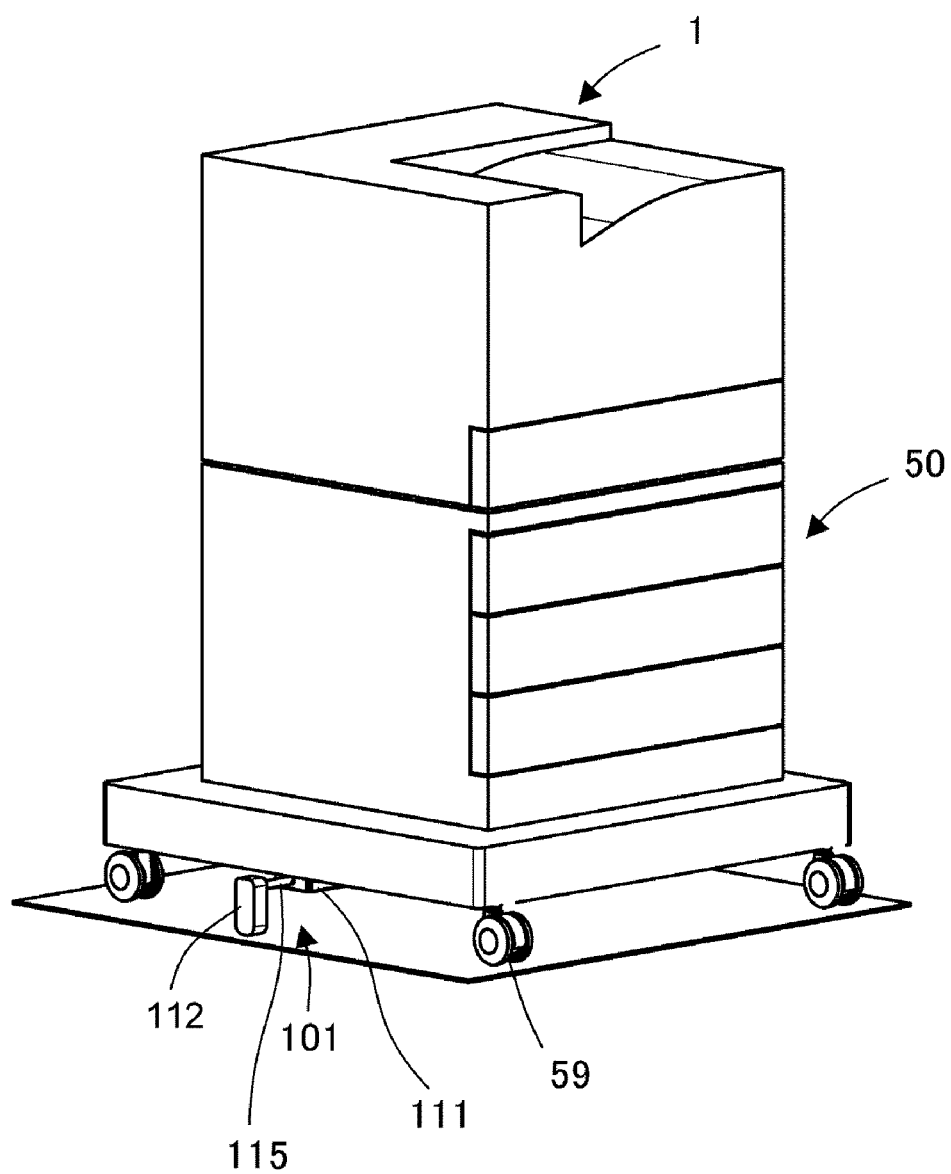
FIG. 4 is a perspective view illustrating the apparatus as a whole when the supporting member is located at a projecting position.
Figure 5:
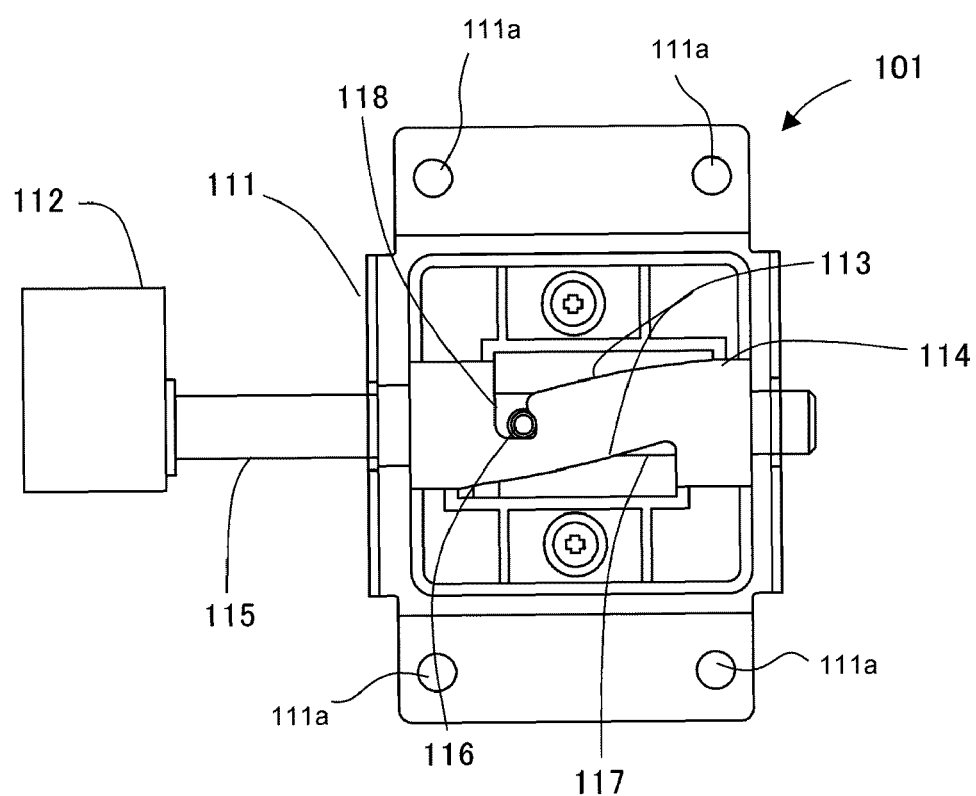
FIG. 5 is a top view illustrating the apparatus supporting mechanism when the supporting member is located at the projecting position.

Casters 59 are attached to the feeding stack at the four corners at the bottom of the feeding deck 50, as illustrated in FIGS. 4 and 5. The casters 59 are attached in consideration of the movement in the state in which the printer body 1 is placed on the feeding deck 50, and therefore, have a satisfactory load resistance.

In FIGS. 1 to 5, apparatus supporting mechanism 101 supports the apparatus in order to prevent the apparatus from falling down. The apparatus supporting mechanism 101 is disposed at the bottom surface of the feeding deck 50, and has a configuration described below.

Figure 1:
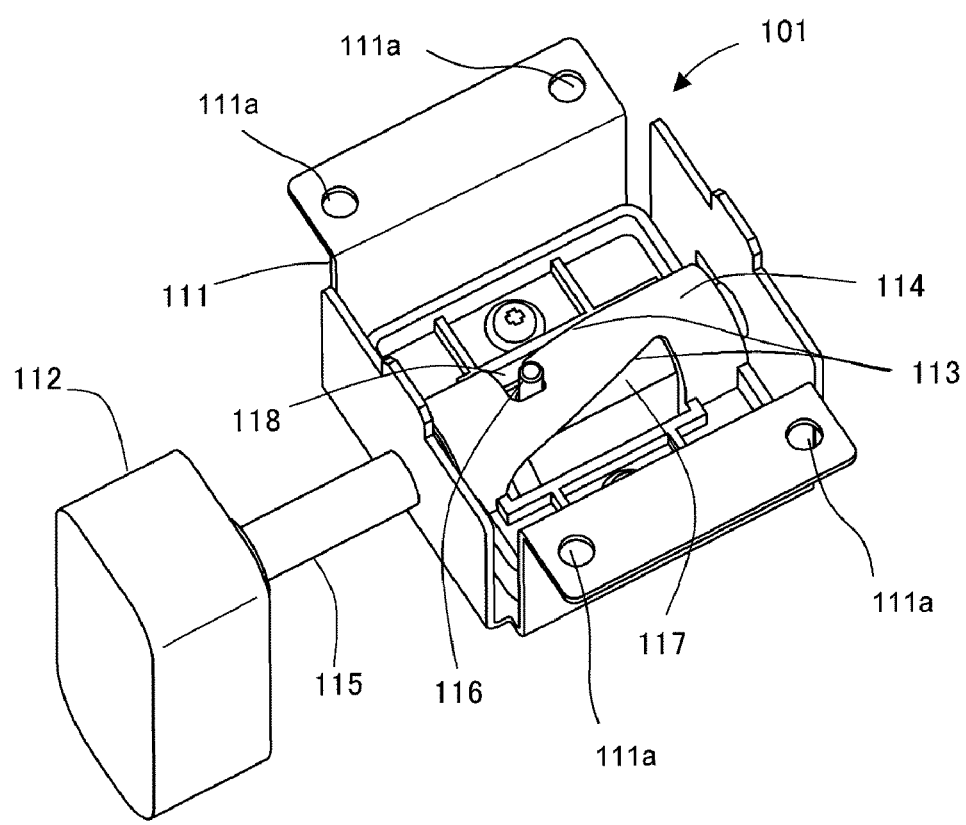
FIG. 1 is a perspective view illustrating an apparatus supporting mechanism.

As illustrated in FIG. 1, the apparatus is fixed to the bottom surface of the feeding deck 50. The apparatus supporting mechanism 101 includes a fixing member 111, a guiding member 114, a connecting member 115 and a supporting member 112. The fixing member 111 is formed into the shape of a box, and is fixingly screwed at the bottom surface of the feeding deck 50 via screw holes 111a bored at a flange in an upper portion. Inside of the fixing member 111 is contained the guiding member 114. In addition, the connecting member 115 slides with respect to the fixing member 111 in such a manner as to project therefrom or be housed therein. To an end of the connecting member 115 is fixed the supporting member 112 which is grounded onto the apparatus installation surface when the feeding deck 50 is inclined so as to support the feeding deck 50 and/or printer body.

The supporting member 112 is formed into the shape of a cuboid having one long side, as illustrated in FIG. 1. The supporting member 112 can be displaced between a first position, at which it is grounded onto the installation plane of the feeding deck 50 by a displacing mechanism, and a second position, at which it is separated from the installation plane.

The displacing mechanism will be descried. As illustrated in FIG. 1, the guiding member 114 having guide grooves 113 is housed inside of the fixing member 111. Meanwhile, the supporting member 112 is fixed to the end of one side of the shaft-like connecting member 115, and therefore, is fixed in such a manner as to be rotatable in association with the connecting member. The connecting member 115 is fixed to the fixing member 111, and further, is fixed in a manner as to project from the fixing member 111 or be housed therein. Accordingly, the supporting member 112 also projects outward of the installation region of the feeding deck 50 or is retractable into the installation region of the feeding deck 50.

Additionally, the connecting member 115 has a pin 116 to be guided serving as a portion to be guided projecting therefrom, and thus, the pin 116 to be guided is fitted in the guide groove 113 formed at the guiding member 114.

Here, the guide groove 113 is formed in the shape of a helix the axis of which lies in the direction in which the connecting member 115 projects and is housed. As a consequence, the pin 116 to be guided is adapted to be rotated along the helical guide groove 113 when the guiding member 114 is made to project and be housed.

Moreover, a housing spring 117 serving as a biasing member comprising a compression spring extending through the connecting member 115 is interposed between the pin 116 to be guided and the fixing member 111. In this manner, the connecting member 115 is biased at all times toward the housing direction by the housing spring 117. Additionally, a locking portion 118 for locking the pin 116 to be guided is formed at the guide groove 113 so as to maintain the projecting state at a position from which the connecting member 115 projects.

Figure 2:
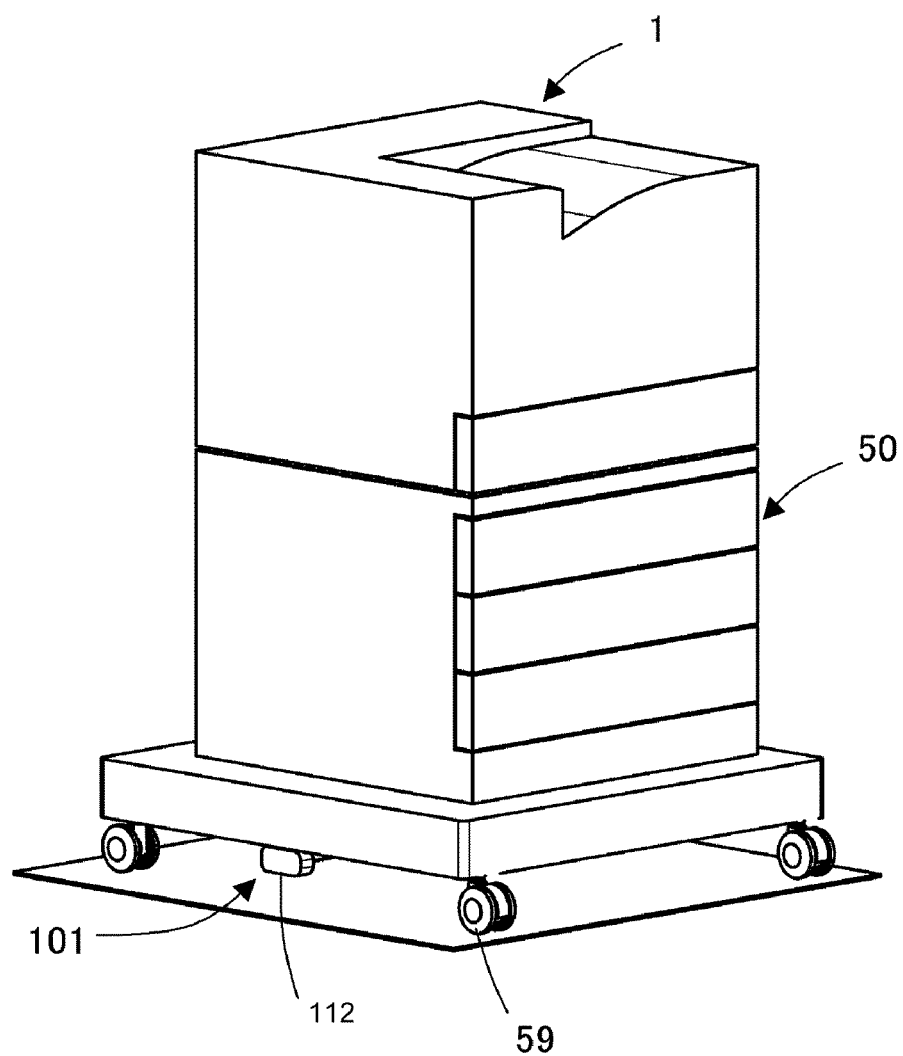
FIG. 2 is a perspective view illustrating an apparatus as a whole when a supporting member is located at a housed position.
Figure 3:
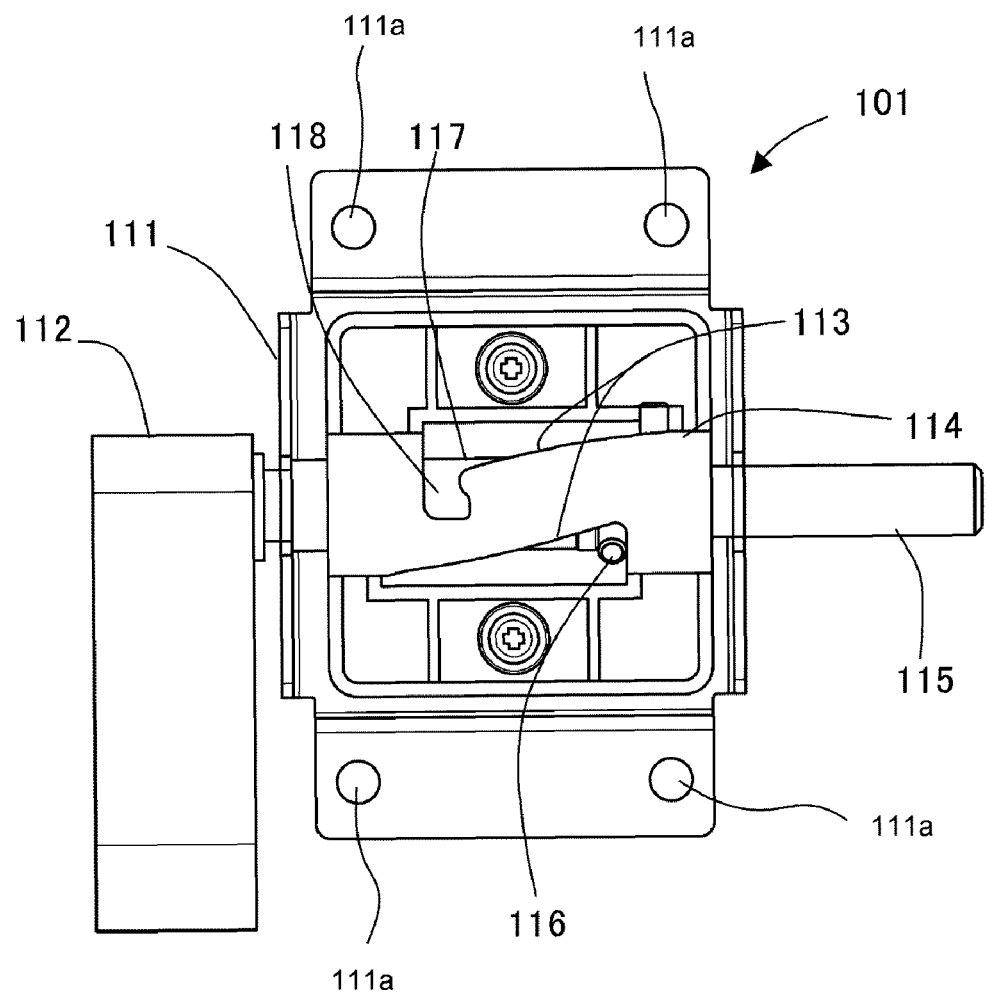
FIG. 3 is a top view illustrating the apparatus supporting mechanism when the supporting member is located at the housed position.

The supporting member 112 fixed to the end of the connecting member 115 can be displaced between the first position, at which the supporting member 112 is grounded with respect to the installation plane of the feeding deck 50, and the second position, at which the supporting member 112 is separated from the installation plane, as described above. In other words, the supporting member 112 becomes horizontal in a longitudinal direction, to be thus separated from the ground or the installation plane of the feeding deck 50 in a state in which the connecting member 115 is housed (at the second position), and then, is retracted in the installation plane of the feeding deck 50, as illustrated in FIG. 2. At this time, the connecting member 115 is maintained in a state drawn by the housing spring 117, and then, the supporting member 112 is fixed in the housed state, as illustrated in FIG. 3.

In the meantime, when the supporting member 112 is pulled in such a manner that the connecting member 115 projects, as illustrated in FIG. 4, the pin 116 to be guided is rotated by ¼ under the guidance of the spiral guide groove 113, as described above. As a consequence, the supporting member 112 projects outward of an installation area of the feeding deck 50, and further, is grounded to the installation plane while the longitudinal direction thereof is oriented vertically (i.e., the first position). At this time, the pin 116 to be guided is fitted into the locking portion 118 of the guide groove 113, as illustrated in FIG. 5, and thus, the supporting member 112 is fixed in this state.

When the supporting member 112 is displaced to the first position, it may not be completely grounded onto the apparatus installation plane. When the apparatus is inclined, the supporting member 112 is adapted to prevent the apparatus from falling over. Therefore, the supporting member 112 may be normally located in the proximity of the apparatus installation plane, but the supporting member 112 may be grounded to support the apparatus when the apparatus is even slightly inclined. As a result, the first position of the supporting member 112 in the present embodiment includes not only the position at which the supporting member 112 is completely grounded but also a position at which the supporting member 112 is located adjacent the ground—i.e. in the proximity of the installation plane.

As illustrated in FIG. 1, when the supporting member 112 is drawn from the housed position, the pin 116 to be guided is drawn while being rotated under the guidance of the spiral guide groove 113. In contrast, when the supporting member 112 projects, the locking portion 118 is released from being locked to the pin 116 to be guided by slightly drawing the supporting member 112. And then, the connecting member 115 is drawn by the tensile force of the housing spring 117, so that the supporting member 112 is retracted and housed at the housed position while being rotated.

As described above, with the apparatus supporting mechanism in the present embodiment, after the apparatus is moved to the installation position, the operation for making the supporting member 112 project or be retracted (housed) in order to prevent the apparatus from falling down and the operation for grounding or separating the supporting member 112 to or from the apparatus installation plane can be implemented by a single operation. Thus, it is possible to enhance the switching operability of the supporting mechanism.

Second Embodiment

The apparatus supporting mechanism is disposed at the bottom of the sheet feeding apparatus in the above-described embodiment. However, in the case where no sheet feeding apparatus is optionally fixed to the image forming apparatus, the casters may be fixed to the bottom of the image forming apparatus in a movable manner, and then, the above-described apparatus supporting mechanism may be fixed to the bottom of the image forming apparatus directly.

Alternatively, the above-described apparatus supporting mechanism need not be limited to the case where it is fixed to the bottom of the sheet feeding apparatus or the image forming apparatus, and is effective in the case where it is fixed to another movable apparatus to prevent the apparatus from falling over.

An apparatus supporting mechanism which is disposed at a bottom of an apparatus movable on an installation plane and can support the apparatus when the apparatus is installed in order to achieve the above object, includes a fixing member fixed to the bottom of the apparatus; a connecting member disposed in the fixing member in such a manner as to freely project and be housed; a supporting member disposed in the connecting member and freely displaced between a first position, at which the supporting member is grounded or located proximate with respect to the installation plane of the apparatus, a second position, at which the supporting member is separate from the installation plane of the apparatus; and a displacing mechanism which displaces the supporting member to the first position when the connecting member projects while displaces the supporting member to the second position when the connecting member is housed.

A sheet feeding apparatus in order to achieve the above object, includes a sheet stack disposed in the apparatus, to stack sheets thereon; a sheet feeding member which feeds the sheet from the sheet stack; and the apparatus supporting mechanism disposed at the bottom of the apparatus.

An image forming apparatus in order to achieve the above object, includes the sheet feeding apparatus; and an image forming portion which forms an image on a sheet fed from the sheet feeding apparatus.

An image forming apparatus in order to achieve the above object, includes an image forming portion which is disposed in the apparatus so as to form an image on a sheet; and the apparatus supporting mechanism disposed at the bottom of the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-228480, filed Sep. 4, 2007, which is hereby incorporated by reference herein in its entirety.

What is claimed is:

1. An apparatus supporting mechanism for supporting an apparatus when the apparatus is installed on an installation plane, comprising:
   a fixing member for fixing the apparatus supporting mechanism to the bottom of the apparatus;
   a connecting member disposed in the fixing member in such a manner as to project from or to be retracted into said fixing member;
   a supporting member disposed on the connecting member and freely moveable between a first position, at which the supporting member is grounded or located adjacent the installation plane of the apparatus, and a second position, at which the supporting member is separated from the installation plane of the apparatus; and
   a displacing mechanism which is configured to move the supporting member to the first position if the connecting member projects from the fixing member and to move the supporting member to the second position if the connecting member is retracted into the fixing member;
   wherein the displacing mechanism includes a guiding member having a guide groove and a portion to be guided disposed in the connecting member and is configured such that the supporting member is rotatable by guiding the portion to be guided by the guide groove if the connecting member projects or is retracted, so as to displace the supporting member to the first position or the second position by the rotation of the supporting member.

2. An apparatus supporting mechanism according to claim 1, further comprising:
   a biasing member which biases the connecting member in a retraction direction; and a locking portion which locks the portion to be guided in a state in which the connecting member projects from the fixing member.

3. An apparatus supporting mechanism according to claim 1, wherein the guide groove is a helical groove.

4. A sheet feeding apparatus comprising:
- a sheet stacker disposed in the apparatus, to stack sheets thereon;
- a sheet feeding member which feeds the sheet from the sheet stacker; and
- the apparatus supporting mechanism of claim 1 disposed at the bottom of the apparatus.

5. An image forming apparatus comprising:
- the sheet feeding apparatus of claim 4; and
- an image forming portion which forms an image on a sheet fed from the sheet feeding apparatus.

6. An image forming apparatus comprising:
- an image forming portion which is disposed in the apparatus so as to form an image on a sheet; and
  - the apparatus supporting mechanism of claim 1 disposed at the bottom of the apparatus.

\* \* \* \* \*